Jan. 3, 1933.  L. A. HYLAND  1,892,891
BATTERY CHARGING SYSTEM FOR AIRPLANES
Filed March 9, 1929
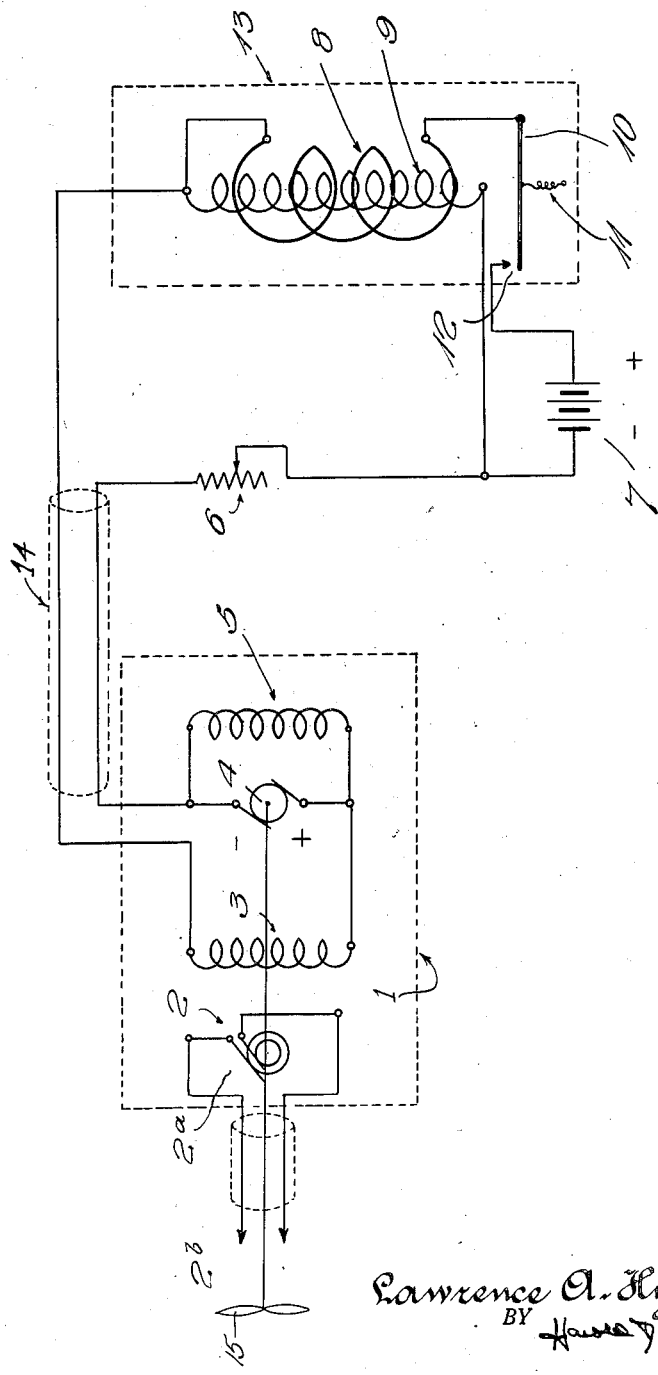
INVENTOR.
Lawrence A. Hyland,
BY
ATTORNEY.

Patented Jan. 3, 1933

1,892,891

UNITED STATES PATENT OFFICE

LAWRENCE A. HYLAND, OF WASHINGTON, DISTRICT OF COLUMBIA, ASSIGNOR TO WIRED RADIO, INC., OF NEW YORK, N. Y., A CORPORATION OF DELAWARE

BATTERY CHARGING SYSTEM FOR AIRPLANES

Application filed March 9, 1929. Serial No. 345,864.

My invention relates to systems for charging storage batteries as employed in airplanes.

One of the objects of my invention is to provide a battery charging system for airplanes whereby the storage batteries are charged when the plane is in the air.

Another object of my invention is to provide a battery charging system for airplanes having high frequency signaling equipment without adding materially to the weight of such equipment.

A further object of my invention is to provide means for utilizing the apparatus normally employed in signaling systems for maintaining the storage batteries in the power circuits thereof in a normally charged condition.

In airplanes and airships it is material that the weight of the high frequency signaling apparatus be reduced as much as possible consistent with efficient operation of the apparatus. It has heretofore been objectionable to employ massive storage batteries as sources of electrical energy for energizing the radio apparatus due primarily to the weight of such batteries. To equip the craft with heavy duty high ampere hour capacity batteries increases this objectionable feature. To equip the craft with small batteries, thereby reducing the weight, presents the disadvantage of limited service from such a source and increases the possibility of nonoperation due to an exhausted battery. The battery charging system for airplanes of my invention avoids many disadvantages and objectionable features of maintaining signaling apparatus in airplanes in service condition.

A better understanding of my invention can be had from the description following and from the accompanying schematic drawing illustrating the battery charging system of my invention.

To supply the necessary energy for energizing the anodes and cathodes employed in high frequency signaling systems, an alternator provided with a small propeller mounted on the shaft thereof is actuated by the wind resistance caused by the movement of the craft through the air or the movement of the air caused by the propeller of the airplane motor. Such alternators are sometimes driven directly by the airplane motive power. In times of distress it has not been infrequent that the radio apparatus was inoperative due to a discharged battery. The alternator was actuated if the plane was in motion; however, the generated alternating current could not be satisfactorily employed to energize certain circuits of the transmitter or of the receiver. Such an alternator as above referred to is illustrated in the accompanying drawing and is designated by the reference character 1. Alternator 1 comprises an armature 2 having collecting rings connected to an armature winding. Brushes 2a bearing on the collector rings are connected to the radio apparatus through shielded conductor 2b. The propeller 15 is connected to the shaft of the armature 2 of the alternator and provides means for driving the alternator and exciter as the aircraft moves through the air. The field circuit of the alternator includes winding 3 which winding is that which produces the magnetic flux. To produce the magnetic flux a source of direct current is associated with the winding which source is generally referred to as the exciter. The exciter in this instance comprises an armature 4 provided with an armature winding and commutator, the armature winding 4 connecting to the field winding 5 by means of brushes resting against the commutator.

Field winding 3 of the alternator is connected in series with the output of the exciter which is herein shown as of the shunt wound type. Connected also in this series connection is the usual field rheostat 6 and winding 9 of electromagnetic relay 13. When no energy is present in field winding 3 due to non-actuation of armature 4, no energy is present in winding 9 of electromagnetic relay 13. When winding 9 is not energ'zed, armature 10 of relay 13 is not actuated. This causes contact members 12 to be in open position thereby interrupting the circuit to battery 7. Spring 11 returns armature 10 of relay 13 to this position when winding 9 is deenergized. When winding 9 is energized, armature 10 of relay 13 is actuated thereby closing contact members 12 and hence completing the circuit to battery 7. Armature 10 of relay 13 is electrically connected to winding 8 which winding has a substantially lower resistance than the resistance of winding 9. Should no energy be generated in the exciter circuit 4—5 contact members 12 would open thereby preventing discharge of the battery 7 through the windings of exciter 4—5. Winding 8 of electromagnetic relay 13 is adequate to carry sufficient current for the charging of battery 7. Relay 13 is a reverse current relay with respect to the fact that a discharge of battery 7 to the exciter windings is prevented when the exciter is not revolving.

The connections between the field winding 3 of the alternator and the electromagnetic relay 13 are shielded by the conductive casing indicated at 14 for preventing stray electromagnetic fields which are established from interfering with the operation of signal receiving apparatus on the aircraft.

By my invention the use of a separate generator for charging the storage battery on aircraft is avoided. The heat normally dispensed by the alternator field rheostat is by my invention usefully employed to maintain the charge of the storage battery in the radio system.

Many modifications of my invention are possible and it is to be understood that the embodiments of my invention are not to be restricted by the foregoing specification or by the accompanying drawing but only by the scope of the appended claim.

What I claim as new and desire to secure by Letters Patent of the United States is as follows:

A battery charging system comprising in combination with a storage battery, an alternator, means for driving said alternator, means for exciting the field winding of said alternator comprising a shunt connected exciting generator mechanically connected to said alternator, means connecting the field winding of said alternator, said shunt connected exciting generator, and said storage battery in series relation, whereby the exciting current from said generator is supplied to the field of said alternator through said storage battery for charging said storage battery, and a relay in circuit with said last mentioned means for automatically opening the circuit to said storage battery for preventing discharge thereof through the field winding of said alternator and the exciting generator when the driving means is not operating.

LAWRENCE A. HYLAND.